United States Patent [19]

LeBlanc et al.

[11] 4,190,224
[45] Feb. 26, 1980

[54] INTRAVENOUS POLE HOLDER

[76] Inventors: Gerald J. LeBlanc; Edgar J. LeBlanc, both of 73 Pond St. (R), Natick, Mass. 01760

[21] Appl. No.: 915,468

[22] Filed: Jun. 14, 1978

Related U.S. Application Data

[63] Continuation of Ser. No. 790,595, Apr. 25, 1977.

[51] Int. Cl.² .......................................... F16M 13/00
[52] U.S. Cl. .................................................. 248/229
[58] Field of Search ............ 248/207, 226, 2, 316 B, 248/311.3, 535, 226.1, 226.4, 316 C, 229; 24/249 LS, 248 SA, 263 A

[56] References Cited

U.S. PATENT DOCUMENTS

| | | | |
|---|---|---|---|
| 417,997 | 12/1889 | Dupuis | 248/207 X |
| 454,553 | 6/1891 | Whitten | 248/207 X |
| 817,564 | 4/1906 | Howe | 248/226.4 |
| 935,730 | 10/1909 | Bacon | 248/207 |
| 1,764,071 | 6/1930 | Foulke | 248/207 X |
| 2,148,004 | 2/1939 | Yagich | 24/263 A |
| 2,613,243 | 10/1952 | Frear | 24/248 SA X |
| 2,696,963 | 12/1954 | Shepherd | 248/229 |
| 2,867,401 | 1/1959 | Sheahan | 248/226.1 |
| 3,178,139 | 4/1965 | McFarlin | 248/226.2 X |
| 3,337,880 | 8/1967 | Florek | 248/311.3 |
| 3,902,931 | 9/1975 | Danciger | 248/230 |
| 3,909,889 | 10/1975 | Emerson | 24/248 SA X |

Primary Examiner—William H. Schultz
Attorney, Agent, or Firm—Joseph H. Killion

[57] ABSTRACT

We have discovered an improved I. V. pole holder which comprises a pair of substantially parallel first and second plate elements adapted to conform to a substrate, together with means to connect the first and second plate elements to move between an expandable open position whereby the substrate to be clamped may be placed between said first and second plate elements, and a contractable closed position whereby the substrate is secured and compressed between the closed plate elements. Means are provided to lock the first and second plate elements in the closed position.

3 Claims, 7 Drawing Figures

INTRAVENOUS POLE HOLDER

This is a continuation of application Ser. No. 790,595, filed Apr. 25, 1977.

BACKGROUND OF THE INVENTION

OUTLINE:

Medical care and equipment have become more and more complex over the years. The costs, as a result, have soared. Speed and efficiency are increasingly important tools not only for saving lives, but also for reducing the cost of medical care.

Intravenous (I.V.) bottles are a particularly bad offender in the streamlining process. I.V. bottles require either a clumsy stand adjacent the patient's bed, or worse, in an emergency, an attendant to carry the bottle and other paraphernalia. Past efforts have not solved the problem.

U.S. Pat. No. 2,696,963 discloses a portable I.V. bottle carrier which attaches to a leg of the bed and which is vertically adjustable. In addition to dangerously projecting from the bed leg it is slow and awkward to handle, capable of use in only a limited number of positions and expensive to manufacture.

U.S. Pat. No. 3,709,373 discloses a support for an I.V. bottle which while being stable and relatively simple, is capable of only limited use as it only attaches to a crossbar configuration.

A typical hospital bed has four holes inthe frame in which an I.V. pole can be positioned, two of which are located at the top of the bed, and two of which are located at the bottom of the bed. If a standard octagonal orthopedic traction bar is placed over the bed, this bar utilizes all four of the holes and there is no place left to put an I.V. pole.

A typical hospital stretcher has six holes on the frame. An I.V. pole positioned in any of these holes is unstable, especially in the carrying of such a stretcher, due to the shallow depth of these holes, the lack of close tolerances, and the hollow nature of the frame itself. In addition, the I.V. pole may be thewrong size for the particular hole on which it must be used.

A typical hospital wheelchair has one hole on the arm to support an I.V. pole, or a stationary pole on the back. Again the I.V. system is unstable in use. If the arm of the wheelchair is loose, the I.V. pole may fall out.

There is then a need for an I.V. system which is readily and quickly adaptable to any frame structure used in a hospital and which is strong and stable in use, inexpensive and simple in construction and which overcomes the disadvantages of prior devices.

SUMMARY OF THE INVENTION

I have discovered an improved I.V. pole holder which comprises a pair of substantially parallel first and second plate elements adapted to conform to a substrate, together with means to connect the first and second plate elements together in a substantially parallel arrangement and to permit the plate elements to move between an expandable open position whereby the substrate which is to be clamped may be placed between said first and second plate elements, and a contractable closed position whereby the substrate is secured and compressed bewteen the closed plate elements. Means are provided to lock the first and second plate elements in the closed position.

Preferably and optionally my inventin utilizes "bumpers", particularly resilient inserts, and more particularly, rubber inserts, for example, nitrile rubber inserts, on each plate element which contacts the substrate. These inserts aid both in preventing slippage of the I.V. pole while it is in use and in preventing the marring of the substrates which could occur if the plate elements themselves contacted the substrate.

Also optionally the plate elements which contact the substrate are concavely tapered, preferably with a convex taper since most hospital frames are made of round stock, where they are compressed against the substrate.

Preferably a clamping plate further described in the preferred embodiment is utilized to attain stability and to maximize contact area of the improved I.V. pole holder with the substrate. Once again this would utilize the resilient inserts to maximize stabilty and minimize marring of the substrate.

The plate elements will be described more full in the preferred embodiment wherein the connecting means are shown as a screw adjustable means. However, it is recognized that other possible multiple or single means may be employed for the same purpose. Additionally, while applicant prefers that a lightweight metal such as aluminum or magnesium be utilized in the I.V. system, it is recognized that other metals and plastics could be substituted, if they have the necessary physical characteristics.

It is preferred but optional to my invention that a portion of the inner surface of one of the plate elements be adapted with a substantially 45° inclined plane to allow the device to be attached to a hospital orthopedic bar (usually octagonal in shape).

The apertures necessarily should be deep enough to impart the necessary stability to the system, and closely conforming to the outer surface of the I.V. pole. It is preferred to have a multiplicity of apertures on the sides of the I.V. pole holder so that the improved I.V. pole holder can be used in all four directions and to have apertures of different diameters to accomodate I.V. poles with differing diameters.

It is preferred that my invention posess the versatility for anticipated hospital situations. Combination with a hospital bed, wheelchair and stretcher, among others, should be possible.

My invention provides numerous advantages over those devices found in the prior.

It is an advantage of my invention that it may be attached at virtually any frame surface on the hospital bed, stretcher or wheelchair, even an octagonal orthopedic unit. Due to the preferred multiplicity of apertures in several directions the I.V. pole may be substantially parallel or substantially perpendicular to the frame surface to which it is attached.

A further advantage of my invention is that it will not mar or scratch the surface to which it is attached due to the resilient inserts which contact the surface.

Another advantage of my invention is that it is possible to use a shorter, more convenient and safer I.V. bar. The normal bar is approximately three feet long. Since my invention can be attached to virtually any frame surface, a frame surface may be selected where a bar of approximately a foot in length may be utilized.

BRIEF DESCRIPTION OF THE DRAWINGS

FIG. 7 shows a hook device on the side of my invention whereon the I.V. bottle may be hung eliminating the pole altogether.

DETAILED DESCRIPTION OF THE DRAWINGS

Figure 1:
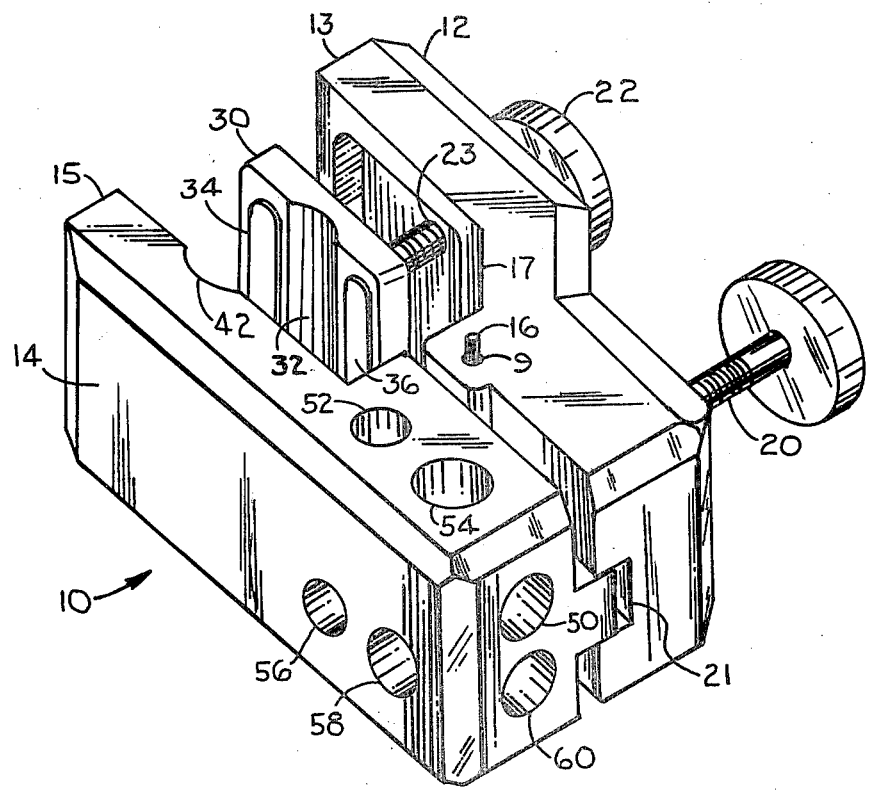
FIG. 1 is an illustrative, isometric view of my improved I.V. pole holder, showing the clamping plate expanded.

Referring now in particular to the accompanying drawings, my improved I.V. pole holder is generally indicated at 10 in FIG. 1 and includes first and second plate elements 12 and 14, respectively, fastened by pin 16 through receiving aperture 9.

First plate element 12 with end 13 is further characterized by recess 11, inclined surface 17 (for adaptation to octagonal surfaces), roller surfaces 18 (FIG. 2) and channel 21.

Second plate element 14 and 15 is further characterized by raised surface 19, substantially conforming to channel 21 when the plate elements are parallel, resilient gripping surfaces 40, 44 (FIG. 3), concavely tapered groove 42, which adapts to one side of a substantially round substrate frame section, receiving apertures 50, 52, 56, which can accomodate a $\frac{1}{4}''$ (one quarter inch) I.V. pole, and receiving apertures 54, 58, 60, which can accomodate a $\frac{1}{2}''$ (one half inch) diameter I.V. pole. This plurality of receiving apertures allows the invention to be used in all four directions.

Clamping plate 30 with resilient gripping surfaces 34, 36, has a concavely tapered groove 32 and is adjusted by first adjusting screw 22, transifixing and threadedly engaging first plate element 12 in threaded channel 23, and attached to clamping plate 30. When the clamping plate is compressed against the particular substrate the plate is held in the closed position by the threaded engagement in first plate element 12.

Second adjustment screw 20 transfixes and threadedly engages plate 12 through threaded channel 25 and impinges on cup 26 in the upper surface of raised surface 19 to move the first and second plate elements toward or away from a substrate when the desired relation of the said first plate element to said second plate element is attained the plates are held in their relative positions by said second adjustment screw 20, which is threaded through said first plate element 12. The relation of the plate elements can then be changed by turning said second adjustment screw 20.

Figure 3:
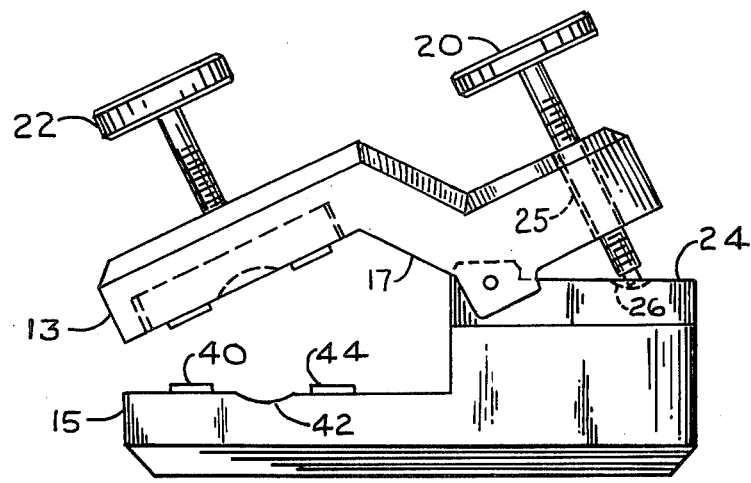
FIG. 3 is a perspective, partially fragmented view of my improved I.V. pole holder showing adjustment of the plate elements.

FIG. 3 shows the improvement I.V. pole holder adjusted towards a closed clamping position with second adjustment screw 20.

Figure 2:
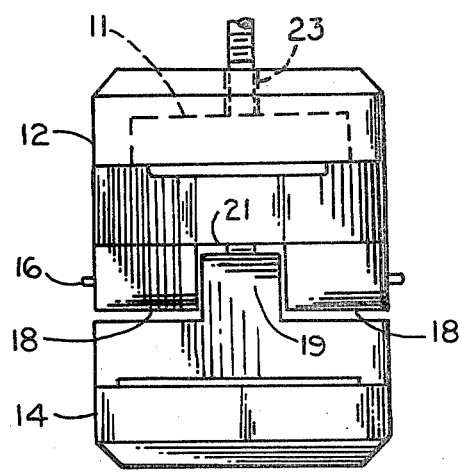
FIG. 2 is an illustrative, partially fragmented, rear view of my improved I.V. pole holder.

FIG. 2 shows in outline recess 11, into which clamping plate 30 retracts.

Figure 4:
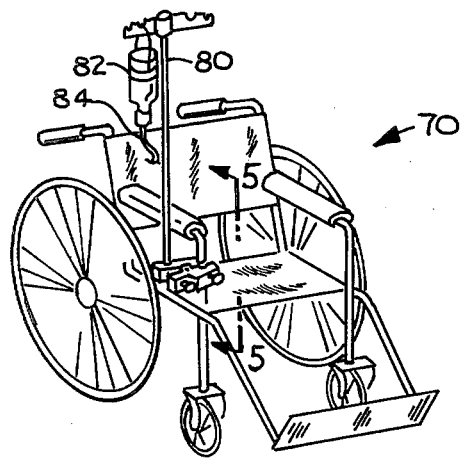
FIG. 4 is an illustrative, in-use view of my improved I.V. holder attached to a wheel-chair.

FIG. 4 shows the improved I.V. pole holder in use, attached to the round arm 72 (FIG. 5) of the wheel-chair, 70. I.V. pole 80, having I.V. bottles 82, and I.V. tube 84, is positioned in aperture 54.

Figure 5:
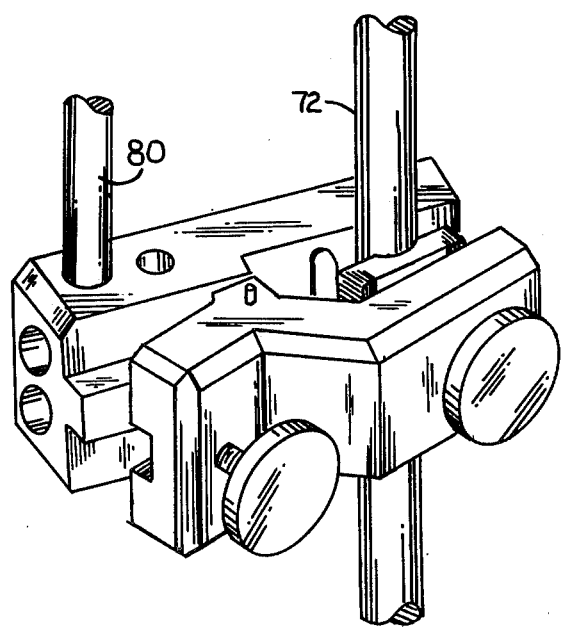
FIG. 5 is an illustrative view taken along 5—5 axis of FIG. 4 showing detail of the attachment of my invention of the wheel-chair arm.
Figure 6:
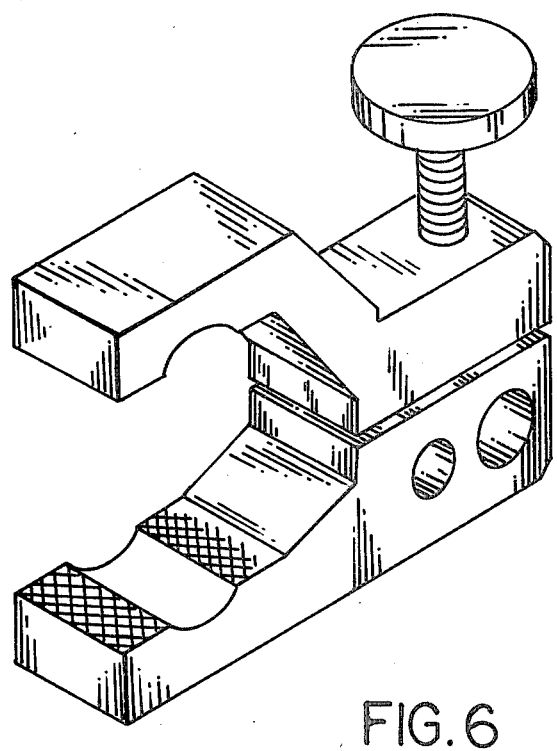
FIGS. 6 and 7 are perspective views of an alternate embodiment of my invention.

FIG. 5 shows a view along sections 5—5 of FIG. 4.

Figure 7:
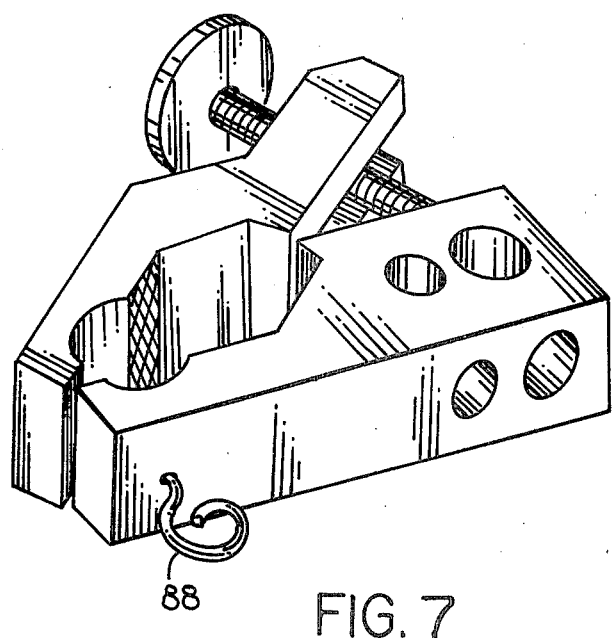

In FIG. 7 hook 88 protrudes from the side of my invention.

Typically in use the substrate to be clamped, as on the arm of the wheel-chair shown in FIG. 4, is positioned between the first and second plate elements, after the desired location for the I.V. pole is selected. The clamping plate is lowered by turning the first adjustment screw, until the round wheel-chair arm is grasped on the top by the concavely tapered groove in the clamping plate and on the bottom by the concavely tapered groove of the second plate element. Then the second adjustment screw is turned moving the first plate element towards the second plate element. The roller surfaces of the first plate element prevent direct contact of the plate elements and the resultant stoppage of the movement. When the desired compression is attained it will remain so until detachment of the I.V. pole is desired.

An I.V. pole system is then fitted in the appropriate aperture and the wheel-chair and patient are free to move about without requiring the constant attention of the present practice.

In some situations the alternative embodiment shown in FIG. 7 may be utilized to avoid the use of a pole altogether. The device may be clamped on a surface of the bed and the I.V. bottle and tubes may be hung on the hook member.

If the substrate is octagonal (e.g., an orthopedic bar), then the substrate fits against the inclined surface of the improved I.V. pole holder.

What I claim is:

1. An improved clamping device for a substrate which comprises:
   (a) a pair of substantially parallel first and second plate elements adapted to conform to said substrate, arranged in a substantially parallel arrangement to permit the plate elements to move between an expanded open position whereby the substrate to be clamped may be placed between first and second plate elements, and a contractable closed position whereby the substrate is secured and compressed between the closed plate elements;
   (b) the said first plate element defining a channel running from one end thereof part way along the direction thereof;
   (c) said second plate element defining a longitudinal raised section running from an end thereof part way along the longitudinal direction, adapting to said longitudinal groove of said first plate element when said clamping device is in said open expandable open position;
   (d) pin means joining said first plate element to said second plate element;
   (e) screw means threadingly engaging said first plate element and impinging on said longitudinal raised section of said second plate element, adjustable over a range of positions to engagingly move said first and second plate elements between said open expandable position and said contractable closed position.

2. The improved clamping device of claim 1 (substitute) in combination with an IV pole.

3. An improved I.V. pole holder in combination with an I.V. pole and including:
   (a) a pair of substantially parallel first and second plate elements adapted to conform to said substrate;
   (b) a first plate element defining longitudinal channel running from one end thereof partway along the longitudinal direction thereof and having a recess in the clamping surface thereof;

(c) a second plate element defining a longitudinal raised section running from an end thereof partway along the longitudinal direction adapting to said longitudinal groove of said first plate element when said clamping device is in said open expandable position;

(d) pin means joining said first plate element to said second plate element;

(e) screw means transfixing said first plate element and impinging on said longitudinal raised section of said second plate element adjustable over a range of positions to engagingly move said first and second plate elements between said open expandable position and said contractable closed position;

(f) a clamping plate substantially conforming to the dimensions of said recess;

(g) means to move said clamping plate between a first retracted position within said recess and a second clamping position compressing against said substrate.

* * * * *